United States Patent [19]
Elgas et al.

[11] 4,455,230
[45] Jun. 19, 1984

[54] PLEATED MEMBRANE TRANSFER DEVICE UTILIZING POTTING AND THIXOTROPIC ADHESIVE

[75] Inventors: Roger J. Elgas, Littleton; Gary A. Carson, Evergreen, both of Colo.

[73] Assignee: Cobe Laboratories, Inc., Lakewood, Colo.

[21] Appl. No.: 371,978

[22] Filed: Apr. 26, 1982

[51] Int. Cl.³ .............................................. B01D 31/00
[52] U.S. Cl. ................................. 210/232; 210/321.4; 210/493.2; 422/48
[58] Field of Search ............................ 422/48; 55/158; 210/232, 321, 493

[56] References Cited

U.S. PATENT DOCUMENTS

| | | | |
|---|---|---|---|
| 3,342,729 | 9/1967 | Strand | 210/638 |
| 3,862,031 | 1/1975 | Leonard | 422/48 X |
| 4,038,190 | 7/1977 | Baudet et al. | 210/321.1 |
| 4,163,721 | 8/1979 | Lobdell | 210/232 |
| 4,165,287 | 8/1981 | Goyne | 210/232 |
| 4,239,625 | 12/1980 | Hlavinka | 210/321.3 |
| 4,246,121 | 1/1981 | Corbin et al. | 210/321.3 |
| 4,267,044 | 5/1981 | Kroplinski et al. | 210/493.5 X |

*Primary Examiner*—David R. Sadowski

[57] ABSTRACT

Potting the spaced-apart fold edges of a pleated membrane and spacer stack to the interior of a housing without blocking the fluid passages between the spaced-apart pleats by applying a layer of thixotropic adhesive to the fold edges of the pleated membrane and spacer stack and thereafter injecting the potting material between the layer of thixotropic adhesive and the housing.

7 Claims, 4 Drawing Figures

PLEATED MEMBRANE TRANSFER DEVICE UTILIZING POTTING AND THIXOTROPIC ADHESIVE

FIELD OF THE INVENTION

The invention relates to membrane-type fluid flow transfer devices.

BACKGROUND OF THE INVENTION

In membrane-type fluid flow transfer devices, one fluid flows past one surface of a semipermeable membrane, another fluid flows past the other surface, and transfer of matter through the membrane from one fluid to the other occurs.

U.S. Pat. Nos. 4,163,721; 4,165,287; 4,239,625; and 4,246,121, which are hereby incorporated by reference, disclose such a device designed for use as a blood dialyzer. It has a pleated membrane potted within a housing to define alternate blood and dialysate passages, and a pleated, fluid-transmissive spacer netting is placed in the lower-pressure dialysate passages on the dialysate side of the membrane. During construction of the device, the entrances to the blood passages between adjacent membrane fold edges are maintained closed while potting material is injected between the housing and the fold edges to avoid blockage of the blood passages by the potting. One disclosed method of maintaining the entrances closed involves increasing the pressure on the dialysate side of the membrane. Another disclosed method involves painting an adhesive primer on the membrane fold edges to bond adjacent edges together.

In adapting the above-described fluid flow transfer device for use in a blood oxygenator, it was decided to place spacers between folds on the blood side of the membrane, the side potted to the housing, to facilitate the opening of the blood channels during use. This use of spacer in the blood passages, however, prevented maintaining the entrances to blood passages closed during potting by the two methods described above.

SUMMARY OF THE INVENTION

It has been discovered that the fold edges of a pleated membrane can be potted to a housing without blockage of fluid passages between the spaced-apart pleats with potting material by applying a layer of thixotropic adhesive to the fold edges of the pleated membrane and spacer stack and thereafter injecting potting between the layer of thixotropic adhesive and the housing. During application of the adhesive to the edges, it contacts the fold edges of the membrane; because the adhesive is thixotropic, it will not continue to flow by capillary action or otherwise into the fluid flow passages between adjacent membrane folds.

In preferred embodiments, the spacer material is woven polyvinylidene chloride; the layer of thixotropic adhesive is polyurethane; a strip of thixotropic adhesive is applied between the layer of adhesive and the interior surface of the housing adjacent to the inlet and outlet channels; an integrally-formed rib extends inward from the interior of the housing adjacent to the inlet and outlet channels; another pleated fluid-transmissive spacer is placed on the side of the membrane opposite the side to be bonded; and two such devices are connected to each other and share, at a location between them, a common inlet and outlet for one of the fluids.

PREFERRED EMBODIMENTS

We turn now to the description of the structure, manufacture, and operation of the presently preferred embodiment of the invention, after first briefly describing the drawings.

DRAWINGS

STRUCTURE

Figure 1:
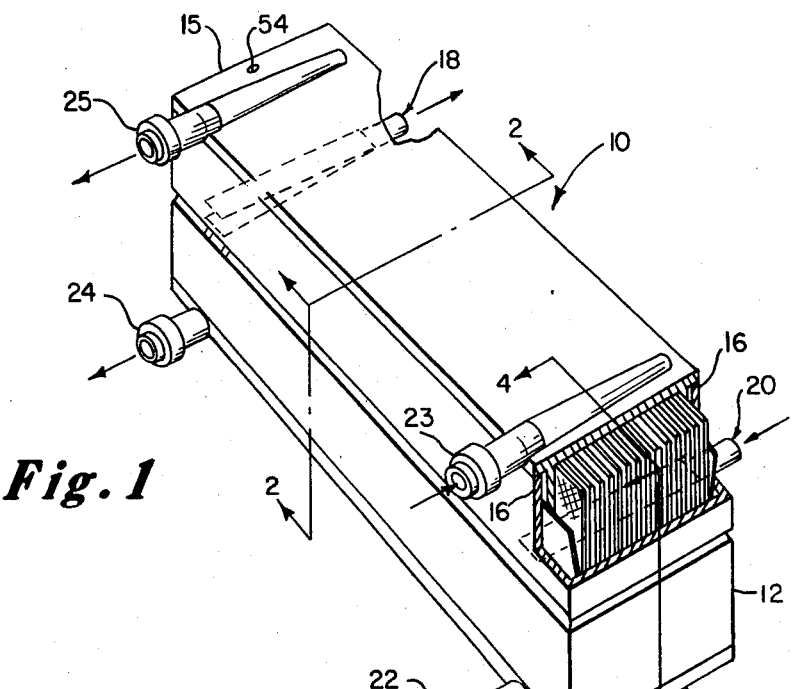
FIG. 1 is a perspective view, partially broken away, of a membrane-type fluid flow transfer device according to the invention.
Figure 3:
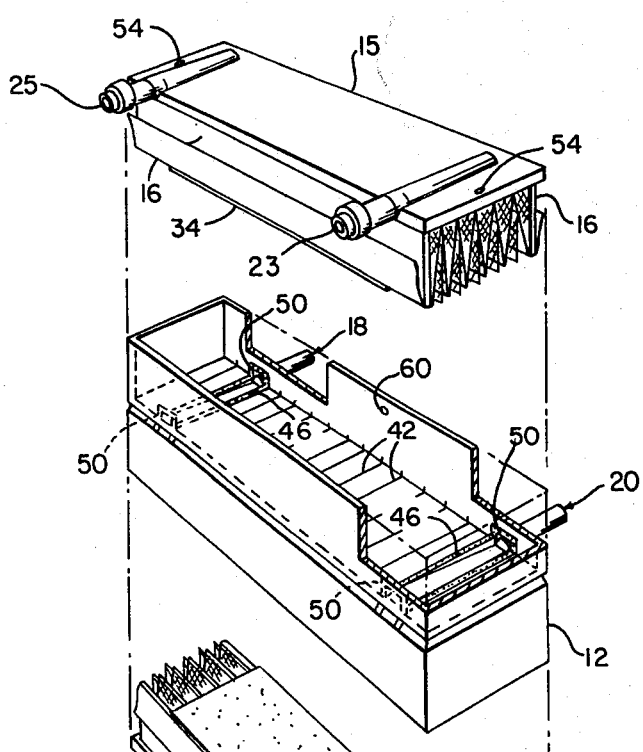
FIG. 3 is an exploded perspective view, somewhat diagrammatic and broken away, of the FIG. 1 device during manufacture.
Figure 2:
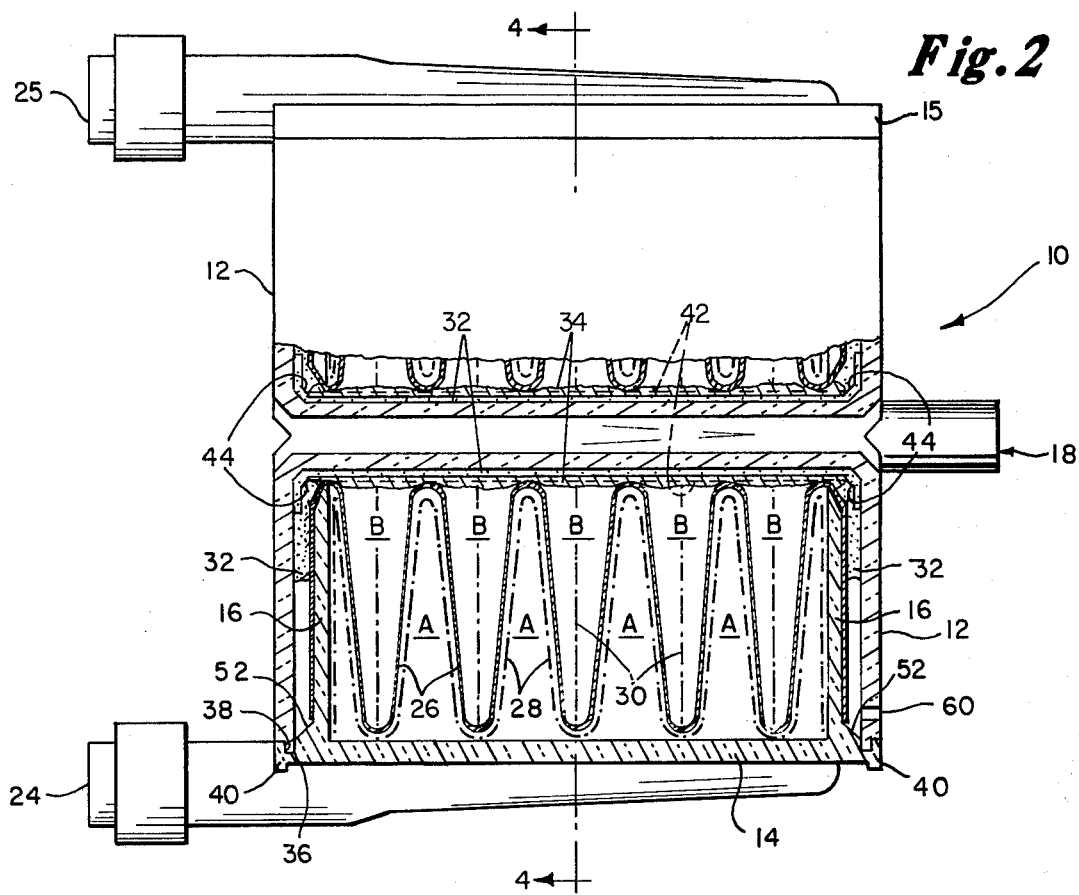
FIG. 2 is a somewhat diagrammatic elevation, partially in section at 2—2 of FIG. 1, of the FIG. 1 device.

Referring to FIGS. 1, 2, and 3, there is shown two-compartment, membrane-type fluid flow transfer device 10 designed for oxygenating blood. The lower compartment comprises the lower half of double trough-shaped polycarbonate housing 12 and interfitting polycarbonate casing 14, which is open at both longitudinal ends and has a pair of longitudinal fins 16. The upper compartment comprises the upper half of polycarbonate housing 12 and interfitting polycarbonate casing 15, which is identical to casing 14. Casing 12 includes blood inlet 20 and blood outlet 18, both integrally molded therewith. Casing 14 includes integrally molded air inlet 22 and air outlet 24, and casing 15 includes air inlet 23 and air outlet 25. Inlets 20, 22, and 23 and outlets 18, 24, and 25 become channels of steadily decreasing cross section when they enter their respective casings. The blood inlet 20 and outlet 18 communicate with both the upper and lower compartments of device 10.

Semipermeable membrane 26 (available from Celanese, Summit, N.J. under the trade designation Celgard 2402), a microporous sheet having a generally accordion pleated configuration and made of polypropylene with 0.2 by 0.02 micron holes, is squeezed with pleated sheet of support netting 28 (a nonwoven polypropylene mesh sold under the Du Pont trademark Vexar), and spacers 30 (a woven polyvinylidene chloride material with 0.020 inch diameter strands spaced 20 strands/inch, available the Chicopee Manufacturing Co., Cornelia, Ga.) between fins 16. The outermost flaps of membrane 26 are sealed with double-sided adhesive tape to the outer faces of the fins and the inner surfaces of housing 12. The folded upper tips, i.e., fold edges, of membrane 26, shown somewhat rounded in FIG. 2, are embedded in layer 34 of thixotropic polyurethane adhesive (available from N. L. Industries, Inc., Hightstown, N.J. under the trade designation N. L. 689-943) that also embeds the folded upper tips of spacers 30 that extend beyond or are level with the tips of membrane 26. Layer 34 is in turn affixed to housing 12 by polyurethane potting 32 (an initially liquid mixture of Polyol 936 and Vorite 689, a urethane prepolymer, both manufactured by N L. Industries, Inc., Hightstown, N.J.). This results in a series of separate parallel blood flow passages, spaced apart by a layer of spacer 30 and indicated by B in FIG. 2, in the valleys above the membrane. Potting of the upper tips seals adjacent tips together and prevents shunting of fluid directly from inlet 20 to outlet 18 without entering passages B.

By this configuration, support netting 28 spaces apart the underside faces of adjacent membrane walls with two layers of the netting and provides parallel air flow passages underneath the membrane, indicated by A in FIG. 2. (In reality, adjacent pleats are compressed together and are not spaced as much as indicated in FIG. 2. Even though the membrane folds and spaces are compressed, the spacers will still permit fluid to flow between the membrane folds.) Unlike membrane 26, netting 28 does not fold over fins 16.

Housing 12 has a continuous peripheral ridge 36 that seats in continuous peripheral groove 38 of shelf portion 40, which surrounds casings 14 and 15. When housing 12 and casings 14, 15 are so interfitted, the tips of fins 16 are vertically spaced from the adjacent inner surfaces of housing 12 and from ribs 42 running transversely on that surface, to avoid cutting of membrane 26 between the pointed fin tips and housing 12.

Figure 4:
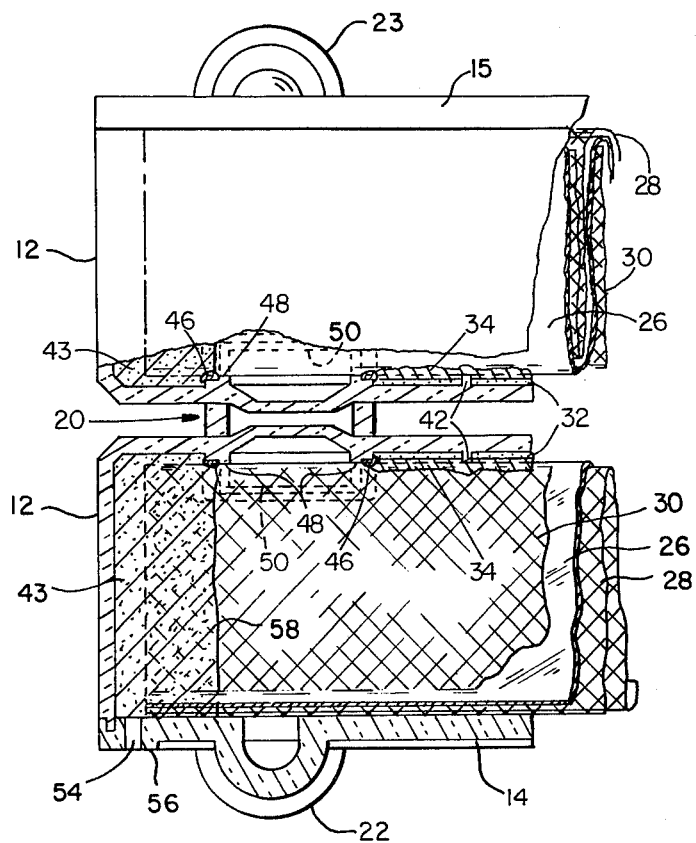
FIG. 4 is a vertical sectional view, partially broken away and taken at 4—4 of FIG. 1, of the FIG. 1 device.

Referring to FIG. 4, the longitudinal ends of membrane 26, netting 28, and spacers 30 are bonded to housing 12 and casing 14 by polyurethane potting 43 (the same as potting 32). Transverse ribs 42 (shown in FIGS. 2 and 4) of housing 12 space the folded tips of membrane 26 from the housing ceiling to provide channels for flow of potting 32 during construction of device 10, described hereinafter. Ribs 42 have arcuate portions 44, which laterally space fins 16 from the angled and vertical sidewalls of housing 12 by tangential contact with fins 16 through membrane 26; portions 44 permit the potting flow channels to extend from the central fluid chamber between fins 16 to the side compartments between each fin and the corresponding sidewall of housing 12. A continuous ridge of General Electric RTV 108 thixotropic silicone rubber adhesive 46 adjacent housing ribs 48 surrounds the channel portion of inlet 20 (and in the same way outlet 18, though not shown) and bonds to a longitudinal end of layer 34 and the membrane fold edges, to act as a formed-in-place gasket in order to prevent flow of potting 32 into the channel region during construction. The adhesive needs to be thixotropic so that it will not itself wick across the membrane folds in the manifold area and thus block entrances to passages B. Inlet 20 and outlet 18 thus cooperate along their channel portions with membrane 26 to form inlet and outlet manifolds into and out of the fluid passages indicated at B in FIG. 2. Likewise inlet 22 and outlet 24 cooperate along their channel portions with membrane 26 on its underside to form inlet and outlet manifolds into and out of the fluid passages indicated at A in FIG. 2.

MANUFACTURE

In constructing device 10, one pleats a sheet of membrane 26 and a sheet of netting 28, and cuts spacers 30, and combines the three by placing each fold of membrane 26 within corresponding folds of netting 28, and inserting spacers 30 in the folds on the other side of membrane 26. The sheets are pleated along generally parallel lines, and the strands of netting 28 run at 45° to those lines. The resultant stack is squeezed together and placed in casing 14 between fins 16, with each of the two outermost flaps of membrane 26 folded over its respective fin. Each outermost flap of membrane 26 is then sealed to the outer face of the adjacent fin 16 with polyurethane potting 32. Layer 34 of thixotropic polyurethane adhesive is then applied to the upper fold edges of membrane 26 with a spatula. Because the adhesive is thixotropic it will contact the membrane tips without flowing far into the blood passages B, where it would cover transport active areas of membrane 26.

Housing 12 is then provided, and two ridges of silicone rubber adhesive 46, each having a weight of approximately one gram, are then applied around the outer edges of the channel portions of inlet 20 and outlet 18 of housing 12, adjacent to ribs 48 and on end shoulders 50 (FIGS. 3 and 4). Casing 14 is then interfitted with housing 12. Ridge 36 is wetted with solvent and then pressed into groove 38, to which it bonds on drying. A ramp portion 52 running along the base of each fin 16 serves to guide ridge 36 into groove 38. The interfitting is done while the silicone adhesive 46 is still wet so that it will be forced a short way (about 1/16 to ⅛ inch) into the membrane folds and bond to layer 34 to prevent wicking of subsequently introduced polyurethane potting in the folds in the manifold area and consequent undesirable blockage of fluid flow into or out of the blood passages between the folds.

Casing 15 is then similarly assembled, and interfitted into housing 12.

The membrane, spacer, and netting longitudinal ends are then potted in polyurethane 43, which is applied through holes 54 in casings 14 and 15 (FIGS. 3 and 4) at each end thereof by a needle inserted through tapes (not shown) placed on raised portions 56 and covering the holes 54. (Only one hole is shown in FIG. 4.) Device 10 is held in a vertical position during this process, with the end to be potted at the bottom. After the first injection, some of the potting rises slightly by capillary action to line 58 (FIG. 4) and cures. Then a second injection fills in the space between the housing and the potting, from which space the potting has flowed by capillary action. After curing of the potting at the end, the device is rotated 180°, with the other end at the bottom, and this end is potted in the same manner as the other end. Holes are sealed with the hardened potting, and the tapes are removed.

The potting of the covered membrane fold edges and flaps to housing 12 now takes place one compartment at a time. Device 10 is positioned horizontally with the membrane tips and layer 34 to be potted below the membrane body (inverted from FIG. 2). Approximately 60 cc of polyurethane potting 32, which comprises an initially liquid mixture of Polyol 936 and Vorite 689, a urethane prepolymer, both manufactured by N. L. Industries, is then pumped into device 10 through hole 60 (FIG. 2) in one sidewall of housing 12. The potting flows into the side compartment formed between the sidewall of housing 12 and one fin 16 through channels between arcuate rib portions 44, down into the trough of housing 12, transversely through channels formed by 0.06 inch deep transverse ribs 42 (FIG. 4), and again through channels between arcuate portions 44 up into the other side compartment between the other sidewall of housing 12 and the other fin 16. Arcuate portions 44 prevent fins 16 from flaring outward to contact the sidewalls of housing 12 and thereby block potting flow into or out of the side compartments. A pair of pinholes (not shown) in housing 14, one adjacent to inlet 22 and the other adjacent to outlet 24, let air escape as the potting is pumped in. The potting settles uniformly on the inner surface of housing 12 and reaches the same level in each side compartment. Because of the layer 34 of thixotropic adhesive, the entrances to passages B between adjacent fold edges are closed, and the potting cannot wick or otherwise flow up between the folds. During potting, thixotropic layer 34 has cured sufficiently to avoid its displacement into blood passages by the pressure of injected potting 32. Layer 32 is used to provide a seal between the housing and layer 34, because although layer 34 has cured, it is still somewhat gummy and otherwise susceptible to displacement and peeling from the membrane tips caused by the pressures used later during operation. Device 10 is then rotated 180° about a horizontal axis, and the other compartment is similarly potted.

OPERATION

When used as a blood oxygenator, device 10 operates as follows. Blood tubing is connected to inlet 20 and outlet 18, and tubing for mixed air and oxygen is connected to inlets 22, 23 and outlets 24, 25. Device 10 is mounted vertically, with inlet 20 and inlets 22, 23 on top. Blood is introduced into inlet 20, flows along its channel portion, and then, partly because of the layer 34 and potting 32, flows into and through the passages B between the folds of membrane in both compartments, until it is collected in the channel portion of outlet 18 and then passes out of device 10. A pressurized mixture of oxygen and air is introduced into inlets 22, 23 and flows along their channel portions where it is distributed into all of the air flow passages A (FIG. 2), through which the air flows. It has been found that the membrane fold edges adjacent to casings 14 do not need to be potted to them. The air and oxygen mixture is collected in the channel portions of outlet 24 and then passes out of device 10. Oxygen transfer occurs through membranes 26 from the air to the blood, and carbon dioxide transfer occurs from the blood to the air.

Because two compartments sharing a common blood inlet and outlet are used, the capacity is doubled without having to use folds that are twice as long and that require the blood to flow transversely for twice the distance from the inlet to fill the passages. This construction also simplifies membrane and netting pleating and mounting and connections within the oxygenating systems.

OTHER EMBODIMENTS

Other embodiments are within the following claims. For example, other thixotropic adhesives will work, and channel seal 46 need not be used, at least on the side of rib 48 adjacent to layer 34, if layer 34 extends far enough to contact rib 48 after interfitting of housing and casing pieces 12, 14, and 15 and does contact rib 48 before it has cured.

What is claimed is:

1. A fluid flow transfer device comprising
    a housing defining a first inlet channel and a first outlet channel for a first fluid spaced from each other by a fluid flow distance, and a housing interior surface,
    a casing sealed to said housing defining a second inlet channel and second outlet channel for a second fluid,
    a pleated membrane within said housing,
    said pleated membrane having a plurality of folds defining fold edges extending along first and second opposite sides of said membrane, fold edges on said first side of said pleated membrane facing said first inlet and outlet channels, fold edges on said second side of said pleated membrane facing said second inlet and outlet channels, said pleated membrane defining spaces including fluid flow passages between adjacent said folds,
    fluid-transmissive spacers between said folds on said first side of said membrane facing said first inlet and outlet channels,
    a layer of thixotropic adhesive on said first side of said pleated membrane on portions of said membrane extending the entire fluid flow distance between portions of said membrane facing said first inlet and outlet channels,
    said thixotropic adhesive contacting said fold edges of said membrane to provide a seal between adjacent membrane fold edges, but not occupying said fluid flow passages between adjacent folds, and
    a layer of potting material between said layer of thixotropic adhesive and said interior surface of said housing, said potting material extending the entire fluid flow distance along said layer of thixotropic adhesive between said inlet and outlet channels,
    said potting material being a different composition than said thixotropic adhesive and being of a composition that would wick between spaced-apart adjacent fold edges of membrane folds having said spacers between them prior to curing.

2. The device of claim 1 further comprising strips of thixotropic adhesive between said layer of thixotropic adhesive and said interior surface of said housing adjacent to said first inlet and outlet channels.

3. The device of claim 2 wherein said housing has integrally formed ribs extending inward from said interior surface of said housing adjacent to said inlet and outlet channels.

4. The device of claim 3 wherein said fluid-transmissive spacers are woven polyvinylidene chloride.

5. The device of claim 4 when said thixotropic adhesive is polyurethane.

6. The device of claim 1 further comprising a second housing, casing, and membrane connected with and identical to the first, said first inlet and outlet channels being common to both housings and between the two housings, said two housings being integral.

7. The device of claim 1 or 6 further comprising a pleated, fluid-transmissive spacer having folds and fold edges covering corresponding said membrane fold edges on said second side.

* * * * *